Feb. 17, 1953     R. PALAZZOLO     2,628,812

ATTACHMENT FOR AUTOMOBILES

Filed June 2, 1950

INVENTOR.
Rosario Palazzolo.

BY William F. Nickel

ATTORNEY.

Patented Feb. 17, 1953

2,628,812

UNITED STATES PATENT OFFICE 2,628,812

ATTACHMENT FOR AUTOMOBILES

Rosario Palazzolo, Bronx, N. Y.

Application June 2, 1950, Serial No. 165,740

1 Claim. (Cl. 254—133)

My invention is an improved attachment for motor cars, such as automobiles for pleasure and business; and particularly an accessory to facilitate raising the car when a tire has to be lifted clear of the ground.

An important object of this invention is to provide an accessory of this kind which can be easily mounted on the chassis of a car at points where an ordinary lifting jack can be employed with both advantage and convenience. At present in the task of elevating a car high enough to change a tire, for example, the jack must be moved under the car far enough to reach an axle or under the bumper bar at the front or back. To get the jack under an axle is more or less difficult and wearisome, and lifting the car with a jack under a bumper frequently bends and distorts the bumper and the parts that hold it in place. The chief aim of my improvement is to obviate most of the effort now required and the risk of damage to the car; especially for the benefit of the owner who may have to change a tire at the roadside.

The nature of the invention is fully set forth hereinafter and the construction of the accessory is fully illustrated in the drawings. I, of course, do not wish to be restricted to the exact structural details that are shown, but reserve the right to make changes within the scope of the invention as the claim defines the same.

Figure 1:
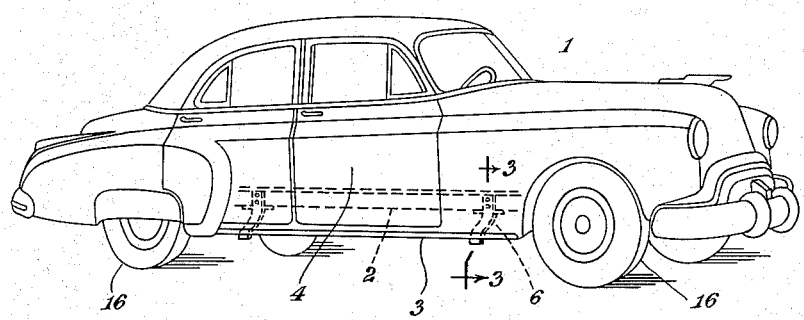
Figure 1 shows an automobile equipped with my invention.
Figure 2:
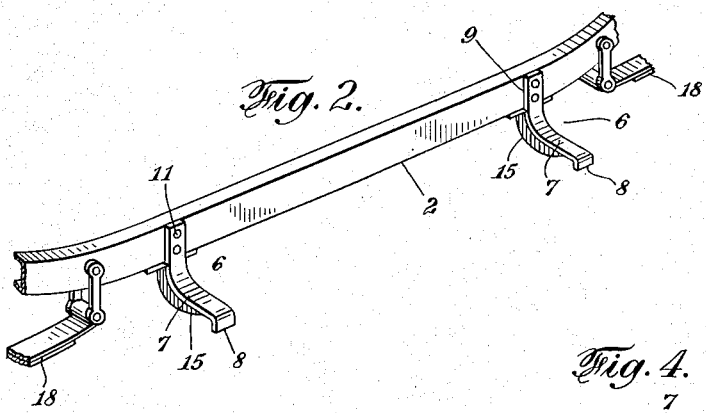
Figure 2 is a perspective view, showing part of the chassis of a car with my improved accessory thereon.
Figure 4:
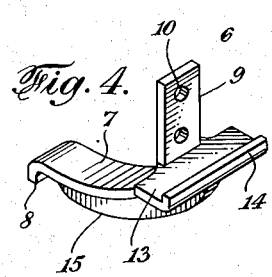
Figure 4 shows my improved attachment in perspective.
Figure 3:
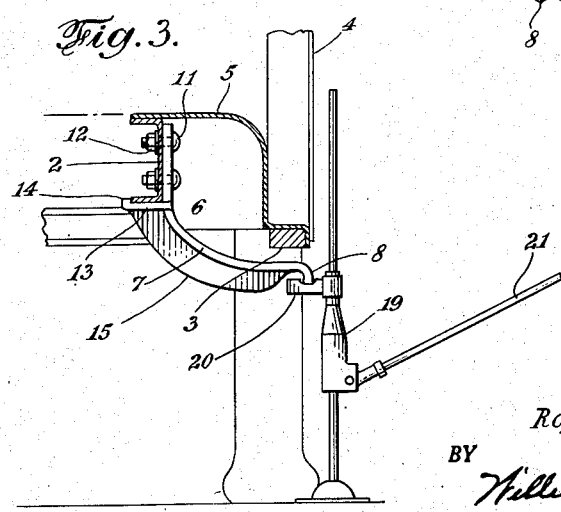
Figure 3 is a section on line 3—3 of Figure 1.

The numeral 1 indicates an automobile with a body mounted on a chassis, all of conventional design. Part of one of the side beams of the chassis is shown at 2, behind the lower part of the side of the body and above the sill 3 of the adjacent door 4. The car may or may not have foot boards along the sills 3. The doors, of course, overlap the floor 5 along their lower edges.

The body of the attachment or accessory is indicated by the numeral 6. Two are secured to each side beam 2, one near the front and the other at the rear, so that each end of the car can be lifted as may be necessary. The attachment comprises a curved foot 7, the lower outer end of which bears a downturned transverse rib or flange 8. The upper end of foot 7 is united to a flank shank 9 with openings 10. Bolts 11 passing through these openings and similar openings in the beams 2, and nuts 12, or a welding operation if preferred, make the attachments fast to the beams 2. The feet 7 extend laterally under the sills 3, or foot boards, if present, far enough to be engaged when a jack is to be put under any one of them.

The attachment 6 is all in one piece and at the junction of the foot 7 and shank 9 is a transverse plate 13 with an upturned outer edge 14. This plate engages the lower flange of the side beam 2 which is shown as channel-shaped, and the shank 9 makes contact with the outer face of the vertical web joining the flanges of the beam 2, the lower flange fitting the plate 13 between the shank 9 and rib 14. Hence the accessory is tight and rigid when affixed in place on the car. The lower side of the foot 7 has a central reinforcing rib 15 extending from the rib 14 of the plate 13 out nearly to the flange 8.

One of these attachments is mounted near each of the wheels 16 at front and back, as fully shown in Figure 1. The springs for the axles of the front and rear wheels are indicated at 18. The lifting is effected by putting a jack 19 under the outer end of the foot 7, with the flange 8 on the head 20 of the jack which can be of any design with an operating handle 21. The head 20 may have a groove in which the flange 8 is received.

With this accessory, the trouble of getting a jack far in under one of the axles, or risking damage if the jack is stood under a bumper bar, is eliminated. The forward attachment is just behind the front wheel and the other just in front of the rear wheel, on each side, and at the right points for raising one end of the car or the other. The accessory is simple and inexpensive to produce and can be quickly secured in position. It is invisible when mounted, but always easy of access when an emergency is present.

The attachment enables one to lift the car without danger of the car shifting or rolling; and one can stand beside the car while working the jack. Hence the red taillight of a car is not hidden or screened if a tire has to be changed at night and risk of a collision is entirely obviated.

Having described my invention, what I believe to be new is:

An attachment for the side beam of an automobile, comprising a body having an upright shank to be affixed to the outer face of said beam, a foot secured to said shank and extending outward and downward when the attachment is in place on said beam and having a downturned transverse flange at its outer end, and a wide cross plate to engage the bottom of said beam, said plate having an upturned transverse flange at its outer edge secured at its midpoint to the junction of said shank and said foot, and extending laterally beyond both sides of said plate and foot, said plate engaging the bottom of said beam when the attachment is mounted thereon, with said flange then overlapping the edge of the beam at the opposite face thereof.

ROSARIO PALAZZOLO.

REFERENCES CITED

The following references are of record in the file of this patent:

UNITED STATES PATENTS

| Number | Name | Date |
|---|---|---|
| 1,496,694 | Watson | June 2, 1924 |
| 2,083,942 | Chase | June 15, 1937 |
| 2,092,719 | Ryerson | Sept. 7, 1937 |

FOREIGN PATENTS

| Number | Country | Date |
|---|---|---|
| 467,563 | Great Britain | June 18, 1937 |
| 476,625 | Great Britain | Dec. 8, 1937 |